US011220462B2

(12) United States Patent
Beaber et al.

(10) Patent No.: US 11,220,462 B2
(45) Date of Patent: Jan. 11, 2022

(54) METHOD OF MAKING CERAMIC MATRIX SLURRY INFUSED CERAMIC TOWS AND CERAMIC MATRIX COMPOSITES

(71) Applicant: 3M INNOVATIVE PROPERTIES COMPANY, St. Paul, MN (US)

(72) Inventors: Aaron R. Beaber, Minneapolis, MN (US); Marc G. Simpson, San Juan Capistrano, CA (US); Kari Ann McGee, New Brighton, MN (US); Amy S. Barnes, Saint Paul, MN (US); Zeba Parkar, Marietta, GA (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 16/963,874

(22) PCT Filed: Jan. 21, 2019

(86) PCT No.: PCT/IB2019/050499
§ 371 (c)(1),
(2) Date: Jul. 22, 2020

(87) PCT Pub. No.: WO2019/142168
PCT Pub. Date: Jul. 25, 2019

(65) Prior Publication Data
US 2021/0047241 A1  Feb. 18, 2021

Related U.S. Application Data

(60) Provisional application No. 62/620,255, filed on Jan. 22, 2018.

(51) Int. Cl.
*C04B 35/117* (2006.01)
*C04B 35/10* (2006.01)
(Continued)

(52) U.S. Cl.
CPC ............ *C04B 35/117* (2013.01); *C04B 35/10* (2013.01); *C04B 35/14* (2013.01); *C04B 35/185* (2013.01);
(Continued)

(58) Field of Classification Search
CPC ............. D04C 1/12; Y10T 428/24124; C03C 2214/02; C03C 2214/03; C03C 2214/20;
(Continued)

(56) References Cited

U.S. PATENT DOCUMENTS 4,902,326 A * 2/1990 Jarmon ................. C03C 14/002
264/109
5,316,797 A   5/1994 Hazlebeck
(Continued)

FOREIGN PATENT DOCUMENTS

DE   19826792   12/1999
EP   0400788    12/1990
(Continued)

OTHER PUBLICATIONS

Trimm, "The Control of Pore Size in Alumina Catalyst Supports: A Review", Applied Catalysis, Mar. 1986, vol. 21, No. 2, pp. 215-238.
(Continued)

*Primary Examiner* — Camie S Thompson
(74) *Attorney, Agent, or Firm* — Thomas M. Spielbauer

(57) ABSTRACT

Methods of making ceramic matrix prepregs are described. The methods include exposing a coated tow of ceramic fibers to a ceramic matrix slurry comprising a solvent and ceramic precursor. The coating is at least partially removed and the slurry infuses into the ceramic fibers to form prepreg. Steps to form ceramic matrix composites are also described, including forming the prepreg into a green body, and sintering the ceramic precursor.

19 Claims, 2 Drawing Sheets

(51) Int. Cl.

| | |
|---|---|
| *C04B 35/14* | (2006.01) |
| *C04B 35/185* | (2006.01) |
| *C04B 35/628* | (2006.01) |
| *C04B 35/80* | (2006.01) |
| *D04C 1/12* | (2006.01) |
| *D06M 15/356* | (2006.01) |

(52) U.S. Cl.
CPC ........ *C04B 35/62844* (2013.01); *C04B 35/80* (2013.01); *D04C 1/12* (2013.01); *D06M 15/3562* (2013.01); *C04B 2235/522* (2013.01); *C04B 2235/616* (2013.01); *D10B 2101/08* (2013.01)

(58) Field of Classification Search
CPC .............. C03C 14/002; D10B 2101/08; C04B 41/4584; C04B 2237/38; C04B 2235/3217; C04B 2235/3826; C04B 2235/422; C04B 2235/428; C04B 2235/483; C04B 2235/5244; C04B 2235/616; C04B 2235/3418; C04B 2235/528; C04B 2235/185; C04B 35/117; C04B 35/565; C04B 35/573; C04B 35/62863; C04B 35/62868; C04B 35/76; C04B 35/80; C04B 35/6284; C04B 35/62844; C04B 35/62813; C04B 35/683; C04B 35/5805; C04B 35/14; C04B 35/63416; C04B 35/64; C04B 35/71; C04B 35/803; C04B 35/806; C04B 35/581; B29K 2105/251; B29K 2305/02; B29K 2309/02; B29K 2309/08; F05D 2300/6033; F05D 2300/6034; F01D 5/282; F01D 5/284; B29C 70/54; B29C 70/30; B29C 70/50; B29C 35/02; B29B 15/127; B29B 15/12; B32B 18/00; B32B 2250/05; B32B 2250/20; B32B 2250/021; B32B 2260/14; B32B 2262/101; B32B 2262/105; B32B 2315/02; B32B 2315/08; B32B 27/00; B32B 5/26; B32B 5/24
USPC .................. 427/220; 501/32, 95.2; 428/113; 264/124, 641, 125
See application file for complete search history.

(56) References Cited

U.S. PATENT DOCUMENTS

| | | |
|---|---|---|
| 5,547,622 A | 8/1996 | Chalasani |
| 6,251,520 B1 | 6/2001 | Blizzard |
| 7,153,379 B2 | 12/2006 | Millard |
| 8,313,598 B2 | 11/2012 | Butler |
| 9,102,571 B2 | 8/2015 | Szweda |
| 2007/0178304 A1 | 8/2007 | Visser |
| 2010/0081556 A1 | 4/2010 | Heng |
| 2013/0157037 A1 | 6/2013 | Matsumoto |
| 2014/0200130 A1* | 7/2014 | Szweda .................. B28B 11/24 501/95.2 |
| 2016/0031762 A1 | 2/2016 | Matsumoto |
| 2017/0348876 A1* | 12/2017 | Lin ..................... C04B 35/6303 |

FOREIGN PATENT DOCUMENTS

| | | | |
|---|---|---|---|
| EP | 0696556 | 2/1996 | |
| EP | 2848599 A1 * | 3/2015 | ............. C04B 35/80 |
| WO | WO-2016016388 A1 * | 2/2016 | ........... C04B 35/505 |
| WO | WO 2017-209852 | 12/2017 | |
| WO | WO 2019-142167 | 7/2019 | |

OTHER PUBLICATIONS

Whittemore, "Industrial Use of Plasticizers, Binders, and Other Auxiliary Agents", American Ceramic Society Bulletin, Nov. 1944, vol. 23, No. 11, pp. 427-432.
International Search Report for PCT International Application No. PCT/IB2019/050499, dated Apr. 12, 2019, 4 pages.

* cited by examiner

METHOD OF MAKING CERAMIC MATRIX SLURRY INFUSED CERAMIC TOWS AND CERAMIC MATRIX COMPOSITES

CROSS REFERENCE TO RELATED APPLICATIONS

This application is a national stage filing under 35 U.S.C. 371 of PCT/IB2019/050499, filed Jan. 21, 2019, which claims the benefit of Provisional Application No. 62/620,255, filed Jan. 22, 2018, the disclosure of which is incorporated by reference in their entirety herein.

FIELD

The present disclosure relates to methods of making prepreg comprising ceramic matrix slurry infused tows of ceramic fibers, including spread tows of ceramic fibers. The methods include exposing a coated tow of ceramic fibers to a ceramic matrix slurry. Methods of forming ceramic matric composites from such prepregs are also described.

SUMMARY

Briefly, in one aspect, the present disclosure provides methods of making a ceramic prepreg comprising: a) exposing at least one coated tow to a ceramic matrix slurry comprising a solvent and a ceramic precursor, wherein the coated tow comprises a bundle of ceramic fibers surrounded by at least 0.2 weight percent of a coating based on the total weight of the coated tow; and b) infusing the slurry into the bundle of ceramic fibers to form the ceramic prepreg; wherein at least 80 percent by weight of the coating is soluble in the solvent at 25° C. In some embodiments, during or subsequent to step (b), at least 50 wt. % of the coating is dissolved from the surface of the coated tow into the slurry.

In another aspect, the present disclosure provides methods of making a ceramic matrix composite comprising (c) forming the ceramic prepreg of the present disclosure into a green body; and d) exposing the green body to a temperature sufficient to sinter the ceramic precursor to form the ceramic matrix composite, wherein at least 50 wt. % of the coating is dissolved from the surface of the coated tow into the slurry prior to step (d). In some embodiments, the sintering temperature is at least 1000° C.

In some embodiments, forming the ceramic prepreg into a green body comprises using filament winding to place the ceramic prepreg to form the green body. In some embodiments, forming the ceramic prepreg into a green body comprises using advanced fiber placement to place the ceramic prepreg to form the green body.

In some embodiments, the tow is a spread tow. In some embodiments, the ceramic fibers comprise oxide ceramic fibers.

In some embodiments, the solvent comprises water. In some embodiments, the coated tow comprises no greater than 3 weight percent of a coating based on the total weight of the coated tow. In some embodiments, at least 95 percent by weight of the coating is soluble in the solvent at 25° C. In some embodiments, during or subsequent to step (b), at least 80 wt. % of the coating is dissolved from the surface of the coated tow into the slurry.

In some embodiments, step (a) comprises exposing a plurality of coated tows to the ceramic matrix slurry. In some embodiments, the coated tows are braided. In some embodiments, the coated tows are woven to form a fabric. In some embodiments, at least a portion of the plurality of the coated tows are spread tows.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
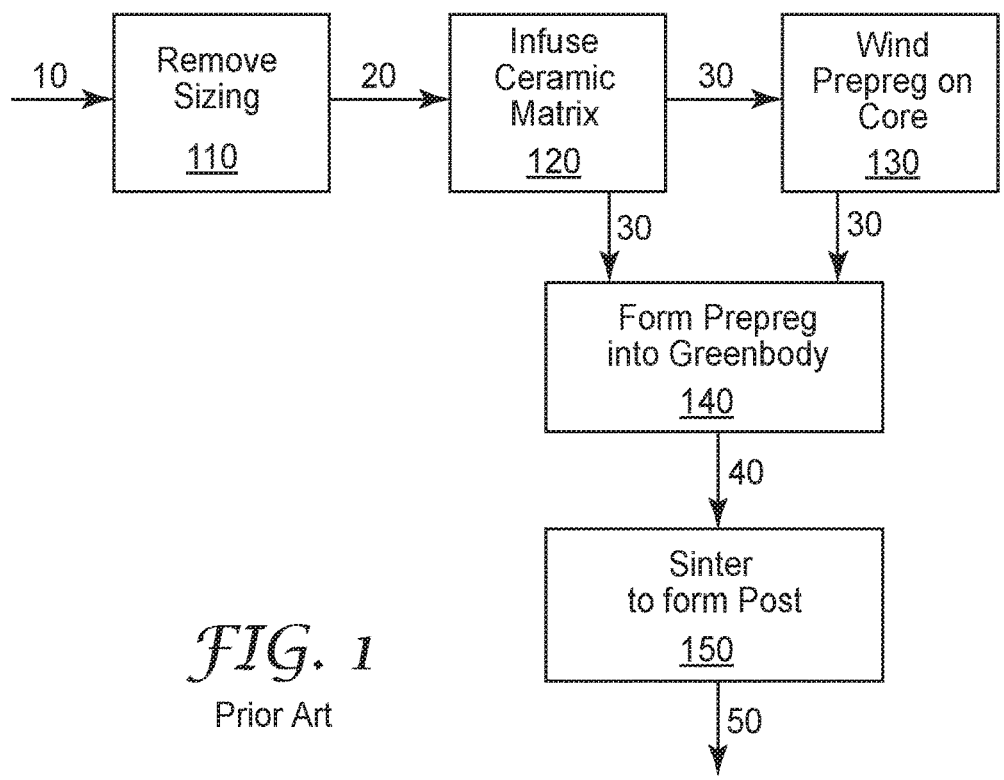
FIG. 1 illustrates a prior-art method of preparing a prepreg and ceramic matrix composite.

Ceramic fibers are well-known and available from a variety of commercial sources. Oxide-based ceramic fibers include, e.g., alumina fibers and alumina-silica fibers. Oxide-based ceramic fibers may include additional components such as boria, alkaline earth oxides, alkali metal oxides, and metals. Nonoxide-based ceramic fibers are based on carbides and nitrides, including oxynitrides, oxycarbides, and oxycarbonitrides. Exemplary nonoxide-based ceramic fibers include silicon carbide, silicon nitride, silicone oxycarbides, and silicon oxycarbonitrides fibers. Such nonoxide-based ceramic fibers may include additional components such as metals or carbon Ceramic fibers are useful in a wide variety of applications. For example, composites may be formed by embedding ceramic fibers in a variety of matrices including polymers (i.e., polymer matrix composites, "PMC"), metals (i.e., metal matrix composites "MMC"), and ceramics (i.e., ceramic matrix composites "CMC"). In some embodiments, ceramic matrix composites, which comprise reinforcing ceramic fibers embedded in a ceramic matrix, can provide superior performance including high-temperature resistance and stability, mechanical strength, hardness, and corrosion resistance.

Ceramic fibers have been available as individual fibers (sometimes referred to as filaments) or as tows. A tow (sometimes referred to as a strand or roving) is a bundle of fibers aligned along a common axis.

Generally, individual ceramic fibers may have a dimeter of about 5 to 20 micrometers, e.g., at least 8 microns to less than 15 microns. Tows of such fibers may have a nominal fiber count of at least 200, e.g., at least 400 fibers. In some embodiments, the nominal fiber count may be as high as 1125, 2550, 5100, or even greater. Examples of some commercially available ceramic fibers and their properties are summarized in Table 1. Tows of ceramic fibers are also available as yarns consisting of multiple tows twisted together.

TABLE 1

Summary of commercially available 3M NEXTEL Ceramic tows.

| Property | Units | NEXTEL 312 | NEXTEL 440 | NEXTEL 610 | NEXTEL 720 |
|---|---|---|---|---|---|
| Chemical Composition | wt. % | 62.5 Al2O3<br>24.5 SiO2<br>13 B2O3 | 70 Al2O3<br>28 SiO2<br>2 B2O3 | >99 Al2O3 | 85 Al2O3<br>15 SiO2 |
| Filament diameter | microns | 8-12 | 10-12 | 11-13 | 12-14 |
| Denier | g/9000 m | 600-3600 | 1000-2000 | 1500-20000 | 15-10000 |
| Nominal filament count | | 400-1375 | 400-750 | 400-5100 | 400-2550 |

The tows may be coated with, e.g., a sizing agent or finishing agent. Such coatings typically contain a variety of organic compounds selected for the desired benefits. For example, for tow used with a polymeric matrix, the coating may be selected to provide compatibility between the ceramic fibers and the polymeric matrix. In such applications, the coating must remain on the fibers during the step in which the polymeric matrix infuses the sized ceramic fiber tow. The presence of the sizing in subsequent, low-temperature processing steps such a curing of a polymeric matrix does not create problems.

In contrast, ceramic matrix composites ultimately undergo high-temperature sintering processes. Exposure to these temperatures can result in degradation and even charring of the sizing material. This can lead to unacceptable defects such as voids or contaminants in the finished part. Also, the organic coating can inhibit the formation of intimate contact between the ceramic fibers and the ceramic matrix, resulting in poor physical properties. Therefore, when preparing ceramic matrix composites, uncoated tows are used, e.g., the coating is removed prior to infusing the tows with the ceramic matrix. For example, coated tows may be heat-treated to burn off any coating materials.

Coated tows are also used when creating woven fabrics of ceramic fibers. The coating composition may be selected to provide lubricity and other features that are advantageous or necessary in typical weaving operations. Again, prior to exposure to ceramic matrices, such coatings must be removed (e.g., burned-off) to avoid defects in later sintering steps.

In a typical CMC processes, a tow of uncoated (e.g., heat-treated) ceramic fibers is impregnated with the ceramic matrix material to form a ceramic prepreg (also referred to as a tow-preg). In one common method, the ceramic fibers are exposed to (e.g., dipped into) a slurry comprising a ceramic precursor and a solvent. The solvent and ceramic precursor are infused into the bundle of ceramic fibers to form the prepreg. This prepreg may be wound onto cores for use in a later process. In other cases, the prepreg is immediately transported to further processes in-line with the impregnation step.

In a subsequent step, the prepreg is formed to the desired shape, sometimes referred to as a "green body," using known methods such as drum winding, filament winding, automated tape layup, and advanced fiber placement. The green body is then exposed to high temperatures to sinter the ceramic precursor, forming the ceramic matrix composite part. In some embodiments, sintering may occur at temperatures of at least 1000° C., e.g., at least 1200° C., or even at least 1400° C. Typically, the sintering temperature will be no greater than 1600° C., e.g., no greater than 1500° C. In some embodiments, the sintering temperature is between 800 and 1400° C., e.g., between 1000 and 1400° C., or even between 1000 and 1200° C., inclusive. The sintering conditions, e.g., temperature, time, and pressure will depend on the composition of the part and its desired properties, and may be selected by known methods.

This prior art process is illustrated in FIG. 1. In cleaning step (110), a coated-tow of ceramic fibers (10) is cleaned (e.g., heat-treated) to remove coating material to form uncoated tows (20). In infusing step (120), the uncoated tow (20) is infused with ceramic matrix material to form a prepreg (30). In some embodiments, this prepreg may be wound on cores for later use (optional winding step (130)). In forming step (140), the prepreg (30) is formed to a desired shape using, e.g., filament winding or advanced fiber placement. The resulting green body (40) is then treated at high temperatures to sinter the ceramic matrix, forming the finished ceramic matrix composite in sintering step (150). Further processing steps may be performed, such as machining, grinding and polishing.

Fabrics formed from tows of ceramic fibers have also been used. In such processes, the coated fabric is treated to remove the coating. The fabric is infused with the ceramic matrix to form a fabric prepreg. The fabric prepreg is then laid-up into the desired shape to form a green body. The green body is then exposed to high temperatures to sinter the ceramic matrix and form the finished ceramic matrix composite part.

Recently, ceramic fiber bundles have become available with a new form factor. Rather than the traditional circular or elliptical-shaped tows, spread tows of ceramic fibers are now available. Beginning with traditional, circular-shaped tows, spread tows may be formed using any known methods including those suitable for use with carbon fibers, e.g., the use of spreader bars. Such techniques spread the fibers of the bundle, significantly increasing the width of the tow while reducing the thickness.

As used herein a "spread tow" refers to a tow of fibers having an aspect ratio (A2/A1) of no greater than 0.05, wherein A1 is the width of the tow and A2 is the thickness. For comparison, traditional circular or elliptical tows may have an aspect ratio ranging from 1 to 0.2. In some embodiments, the aspect is no greater than 0.04, e.g., no greater than 0.03 or even no greater than 0.02. In some embodiments, the aspect is greater than 0.002, e.g., greater than 0.005. In some embodiments, the aspect ratio is between 0.005 and 0.04, e.g., between 0.01 and 0.03, e.g., between 0.01 and 0.02, wherein all ranges are inclusive of the end points.

A spread tow could be as thin as a single layer of fibers. However, in some embodiments, the spread tow has an average thickness of at least 5 fibers, e.g., at least 10 fibers. In some embodiments, the thickness of the spread tow will be no greater than 25 fibers, e.g., no greater than 20 fibers, or even no greater than 15 fibers.

The significantly lower aspect ratio achieved with spread tows results in much more compact packing of the ceramic fibers, less open volume between tows, and as a result, a significant reduction or elimination of the matrix-rich regions associated with circular spread tow constructions. Some advantages of the very low aspect ratio of spread tows of ceramic fibers can be realized when using individual spread tows using fiber placement mechanisms such as filament winding and advanced fiber placement.

Individual spread tows of ceramic fibers may be used with the same materials (e.g., sizings and matrix materials) and in the same manner as traditional circular tows. For example, such spread tows may be applied using filament winding and advanced fiber placement equipment. Modifications may need to be made to handle the width of the spread tows; however, such modifications would be similar to those already required for tapes prepared from parallel rows of traditional circular spread tows.

However, in order to hold their shape as spread tows, a coating is applied to prevent the fiber bundle from reverting to a circular shape during handling, e.g., winding and fiber-handling. If this coating is removed from a spread tow of ceramic fibers before the ceramic matrix is applied, the spread tow may lose its desirable flat, thin form—reverting instead to a more elliptical cross-section. Therefore, the processes used with traditional uncoated tows must be altered.

To avoid the defects associated with the use of coated fibers in a ceramic matric composite, the coating should be removed (e.g., dissolved or dispersed) prior to exposure to high temperatures in e.g., the sintering step. In some embodiments, at least 50% by weight of the coating is removed, e.g., at least 80 wt. % or even at least 95 wt. %.

Generally, ceramic matrix slurries are known, and any such slurry may be used. These slurries contain a solvent and a ceramic precursor. In some embodiments, the slurries contain additional components, as known in the art.

Suitable solvents include water and organic solvents. In some embodiments, water is a preferred solvent, either alone or in combination with an organic solvent. Suitable organic solvents include, e.g., alcohols (e.g., methyl, ethyl, isopropyl, and t-butyl alcohols); aromatic hydrocarbons (e.g., benzene, toluene and xylene); aliphatic hydrocarbons (e.g., heptane, hexane, and octane); glycol ethers (e.g., propylene glycol methyl ether); dipropylene glycol; ethers (e.g., methyl ether, propylene glycol n-butyl ether, propylene glycol n-propyl ether, and ethylene glycol n-butyl ether); ketones (e.g., methyl ethyl ketone and methyl isobutyl ketone); and halogenated hydrocarbons such as 1,1,1-trichloroethane and methylene chloride. In some embodiments, isopropanol, ethanol, butanol, and various acetates may be preferred due to toxicity concerns.

Generally, any known ceramic precursor may be used. The precursor is selected based on its compatibility with the ceramic fibers and the desired end-use properties. Common precursors used in ceramic slurries include sol gel and particulate based refractory materials. Sol gels include colloidal suspensions of particles in the size range of 2-300 nanometers and concentrations from about 5 wt. % to about 30 wt. % of refractory particles. Particulate slurries can use much larger refractory particles, e.g., from 0.2 to 200 microns. Exemplary refractory particles include alumina (Al2O3), and hydrates of alumina (e.g., boehmite or aluminum trihydrate) and silica (SiO2), alumina-coated silica, or mullite.

In some embodiments, a least a portion of the coating is dissolved in the ceramic matrix slurry. For water-based slurries, the performance criteria for coating chemistries include high water solubility, good tow bundling (i.e., film forming), good tow flexibility (i.e., not brittle), and low charring performance during burn-off. This includes many water soluble organics, such as polyvinyl alcohol, glycols (e.g., polyethylene glycol, propylene glycol), polyols (e.g., glycerol), polyolefin oxides (e.g., ethylene oxide, propylene oxide, and copolymers thereof), and polyvinylpyrrolidone, as well as copolymers and blends of any of these. In addition, common ceramic binders and additives including carboxymethyl cellulose, cell gum, guar gum, acacia gum, and sugars (e.g., sucrose or dextrose) can be used either by themselves or in combination.

Similarly, for solvent based matrix slurries, the performance criteria for sizing chemistries includes solvent solubility, good tow bundling, good tow flexibility, and low charring performance during burn-off. An added criterion is solubility in a solvent with low toxicity. Potential coatings include polyvinyl butyral (PVB) and acrylics, as well as polyolefins (e.g., polyethylene), silicones, polyesters, styrene/maleic acid copolymers, styrene/acrylate copolymer, acrylate/acrylamide copolymer, polymethylmethacrylate, microcrystalline wax, hydrogenated polyisobutenes, polydecenes, silicones like polydimethylsiloxanes, oxidized polyethylenes and functional groups containing copolymers of polyethylenes, acrylates/tert-octyl-propenaminde copolymers polyvinylpyrrolidone as well as water soluble versions.

To aide in removal, the coatings of the present disclosure are substantially soluble in the solvent of the ceramic matrix slurry, e.g., water. In some embodiments, at least 80 wt. % of the coating is soluble in the solvent at 25° C. In some embodiments, at least 90 wt. %, at least 95 wt. % or even at least 99 wt. % of the coating is soluble in the solvent at 25° C. For example, when the solvent comprises or consists of water, in some embodiments, at least 80 wt. %, e.g., at least 90 wt. %, at least 95 wt. % or even at least 99 wt. % of the coating is soluble in water at 25° C.

In some embodiments, not all of the coating is dissolved in the solvent. In some embodiments, a portion of the coating may be insoluble. These materials may still be removed and dispersed into the ceramic matrix slurry.

To further aide in removal, low coat weights of the coating may be preferred. In some embodiments, the coating is applied at no greater than 3% by weight based on the total weight of the coated tow, e.g., no greater than 2 wt. %, or even no greater than 1 wt. %. To maintain the integrity of a spread tow, in some embodiments, the coating is applied at at least 0.2 wt. %, at least 0.3 wt. %, at least 0.5 wt. %, or even at least 0.8 wt. % based on the total weight of the coated fiber tow. In some embodiments, the coating is present at 0.2 to 3 wt. %, e.g., 0.2 to 2 wt. %, or even 0.3 to 1 wt. %, based on the total weight of the coated tow.

In general, the coating materials will be removed after the green body is formed. For example, in some embodiments, these materials will evaporate or burn-off during the high-temperature sintering step, along with any organics present in the ceramic matrix slurry itself. In some embodiments, a separate burn-off step may occur prior to the sintering step. In some embodiments, the coating materials will be removed in this separate step.

In some embodiments, it is desirable to use coatings that have low levels of materials that may char (i.e., be reduced to carbon or charcoal) under the burn-off or sintering conditions. In some embodiments, the coatings of the present disclosure comprise no greater than five percent by weight of charring materials, based on the total of the coating. In some embodiments, the coating comprises no greater than 2 wt. %, no greater than 0.5, or even no greater than 0.1 wt. % of charring materials. Materials known to char include, e.g., waxes.

Figure 2:
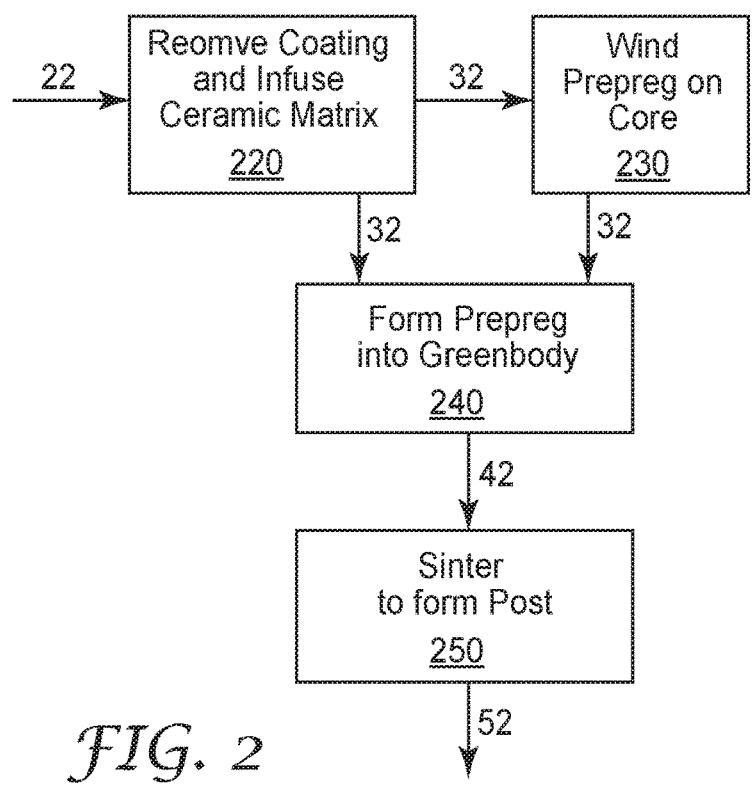
FIG. 2 illustrates a method of preparing a prepreg and ceramic matrix composite according to some embodiments of the present disclosure.

One exemplary method of the present disclosure is shown in FIG. 2. Coated tow of ceramic fiber (22) is processed in hybrid step (220). In hybrid step (220), the tow of coated ceramic fibers is exposed to a ceramic matrix slurry comprising ceramic precursor and a solvent. Upon exposure to the slurry, some of the coating may begin to be removed from the coated tow. The material is transferred to (e.g., dissolved or dispersed in) the ceramic matrix slurry. During this step, the solvent and ceramic precursor infuse into the tow of ceramic fibers to form prepreg (32).

In optional winding step (230), prepreg (32) may be wound on a core for later use. In forming step (240), prepreg (32) is formed into a desired shape by conventional means such as filament winding or advanced fiber placement to form green body (42). As at least a portion of the solvent is still present in the prepreg during these steps, coating can start or continue to be removed from the coated tows and dissolve and diffuse away from the fiber surface into the ceramic matrix. By removing the coating from the surface of the fibers while the ceramic matrix is still in slurry form, good contact is made between the slurry and the surface of the fibers.

In sintering step (150), green body (42) is exposed to high temperatures to sinter the ceramic matrix, forming the finished ceramic matrix composite part (52). In some embodiments, an optional thermal treatment step may occur before sintering. Generally, the organic materials of the coating and the slurry are removed in one or both of these steps. For example, the organic materials are evaporated or burned-off.

Using the coatings and methods of the present disclosure, coated ceramic tows may be used to form ceramic matrix composites without the need of a separate cleaning step. The cost and efficiency benefits of removing a step would be beneficial even when using traditional circular tows of ceramic fibers. However, in some embodiments, the coatings and methods of the present disclosure allow coated spread tows of ceramic fibers to be used without risking the loss of the desirable thin, wide form fabric that can occur if the coating is removed prior to the matrix infusing step of the traditional process.

Coated, spread tows of ceramic fibers may be prepared as follows.

Preparation of Sample ST-1. A water-sized, 10,000 denier NEXTEL 610 ceramic fiber tow (available from 3M Company, St. Paul, Minn., U.S.A.) having a nominal filament count of 2550 was unwound and passed through a tube furnace at 900° C. to dry off the water. The tow was then passed through a series of three spreader bars, evenly spaced apart 7.6 cm horizontally and 5.1 cm vertically. This caused the tow to spread. The resulting spread tow was then coated with polyethylene glycol (20,000 gm/mol, from Alfa Aesar), dried at 140° C. using a hot air gun, and wound on a core. The resulting spread tow had an average width of 7.6 mm, thickness of 0.10 mm. The coating content was 1.5 wt. %, based on the total weight of the coated tow.

Preparation of Sample ST-2. A water-sized 20,000 denier NEXTEL 610 ceramic fiber tow (3M Company) having a nominal filament count of 5100 was unwound and passed through a tube furnace at 900° C. to dry off the water. The tow was then passed through a series of three spreader bars, evenly spaced apart 7.6 cm horizontally and 5.1 cm vertically. This caused the tow to spread. The resulting spread tow was then coated with polyethylene oxide (100,000 gm/mol, from Alfa Aesar), dried at 140° C. using a hot air gun, and wound on a core. The resulting spread tow had an average width of 12.7 mm, thickness of 0.19 mm. The coating content was 1.5 wt. %, based on the total weight of the coated tow.

Preparation of Sample ST-3. A water-sized 10,000 denier NEXTEL 610 ceramic fiber tow (3M Company) having a nominal filament count of 2550 was unwound and passed through a tube furnace at 900° C. to dry off the water. The tow was then passed through a series of three spreader bars, evenly spaced apart 7.6 cm horizontally and 5.1 cm vertically. This caused the tow to spread. The resulting spread tow was then coated with polyethylene oxide (20,000 g/mol, Alfa Aesar), dried at 140° C. using a hot air gun, and wound on a core. The resulting spread tow had an average width of 6.1 mm, thickness of 0.09 mm. The coating content was 3.4 wt. %, based on the total weight of the coated tow.

Preparation of Sample ST-4. A water-sized 20,000 denier NEXTEL 610 ceramic fiber tow (3M Company) having a nominal filament count of 5100 was unwound and passed through a tube furnace at 900° C. to dry off the water. The tow was then passed through a series of three spreader bars, evenly spaced apart 7.6 cm horizontally and 5.1 cm vertically. This caused the tow to spread. The resulting spread tow was then coated with a low molecular weight polyvinyl alcohol (26,000 g/mol, Alfa Aesar), dried at 140° C. using a hot air gun, and wound on a core. The resulting spread tow had an average width of 12.6 mm, thickness of 0.17 mm. The coating content was 0.2 wt. %, based on the total weight of the coated tow.

Preparation of Sample ST-5. A water-sized 20,000 denier NEXTEL 610 ceramic fiber tow (3M Company) having a nominal filament count of 5100 was unwound and passed through a tube furnace at 900° C. to dry off the water. The tow was then passed through a series of three spreader bars, evenly spaced apart 7.6 cm horizontally and 5.1 cm vertically. This caused the tow to spread. The resulting spread tow was then coated with a polyvinylpyrrodliodone (40,000 g/mol, Sigma Aldrich), dried at 140° C. using a hot air gun, and wound on a core. The resulting spread tow had an average width of 12.4 mm, thickness of 0.20 mm. The coating content was 0.7 wt. %, based on the total weight of the coated tow.

The width (major axis A1) and thickness (minor axis A2) of these spread tows, and the ratio of A2/A1 are summarized in Table 2.

TABLE 2

Dimensions of the spread tows prepared from NEXTEL 610 ceramic tows.

| | Spread tow | | | | |
|---|---|---|---|---|---|
| | ST-1 | ST-2 | ST-3 | ST-4 | ST-5 |
| Figure | 3A | 3B | — | — | — |
| Denier | 10,000 | 20,000 | 10,000 | 20,000 | 20,000 |
| Width (A1) | 7.6 mm | 12.7 mm | 6.1 mm | 12.6 mm | 12.4 mm |

TABLE 2-continued

Dimensions of the spread tows prepared from NEXTEL 610 ceramic tows.

| | Spread tow | | | | |
|---|---|---|---|---|---|
| | ST-1 | ST-2 | ST-3 | ST-4 | ST-5 |
| Thickness (A2) | 0.10 mm | 0.19 mm | 0.09 mm | 0.17 mm | 0.20 mm |
| Aspect ratio (A2/A1) | 0.013 | 0.015 | 0.015 | 0.013 | 0.016 |

Figure 3A:
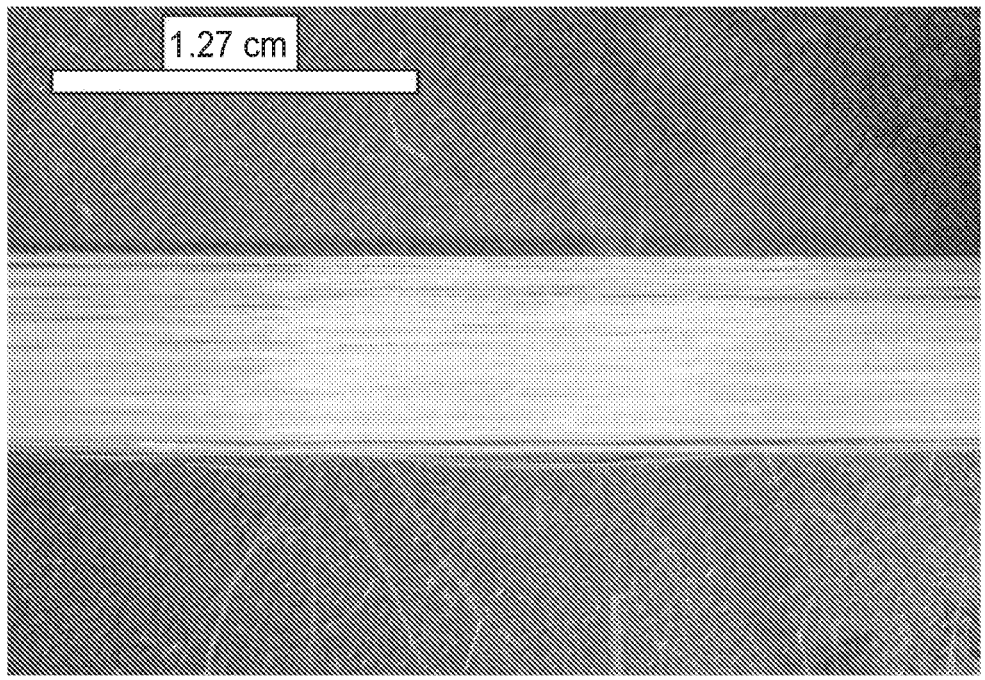
FIGS. 3A and 3B are images of coated spread tows of ceramic fibers suitable for use in some embodiments of the present disclosure.
Figure 3B:
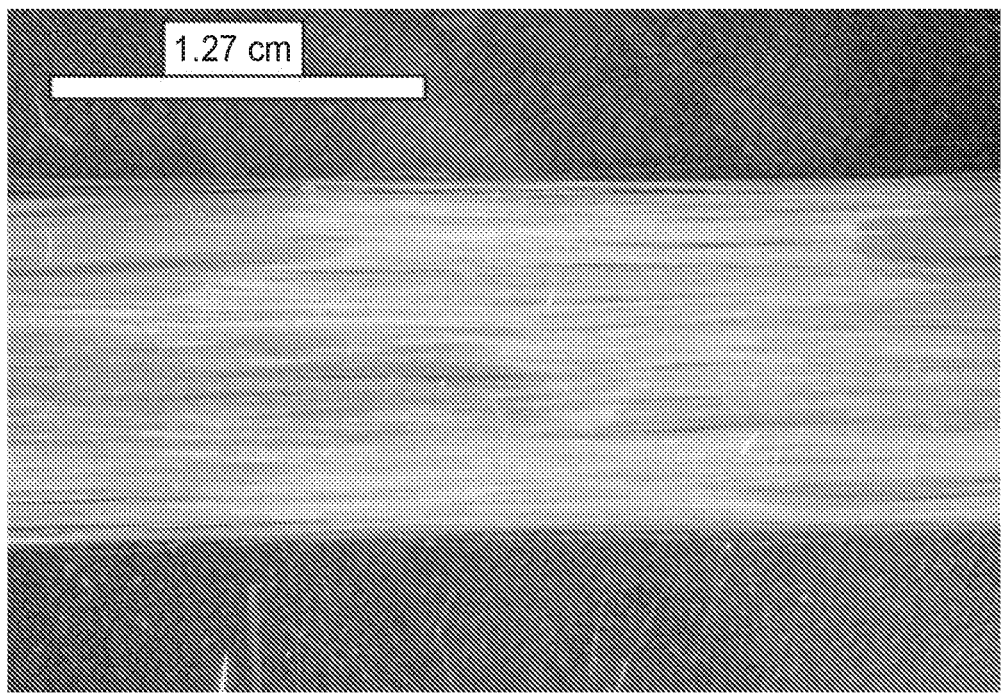

Two exemplary spread tows are shown in FIG. 3A (Spread Tow ST-1) and 3B (Spread Tow ST-2).

Various modifications and alterations of this invention will become apparent to those skilled in the art without departing from the scope and spirit of this invention.

What is claimed is:

1. A method of making a ceramic prepreg comprising:
   a) exposing at least one coated tow to a ceramic matrix slurry comprising a solvent and a ceramic precursor, wherein the coated tow comprises a bundle of ceramic fibers surrounded by at least 0.2 weight percent of a coating based on the total weight of the coated tow; and
   b) infusing the slurry into the bundle of ceramic fibers to form the ceramic prepreg; wherein at least 80 percent by weight of the coating is soluble in the solvent at 25° C.;
   wherein during or subsequent to step (b), at least 50 wt. % of the coating is dissolved from the surface of the coated tow into the slurry.

2. A method of making a ceramic matrix composite comprising:
   c) forming the ceramic prepreg of claim 1 into a green body; and
   d) exposing the green body to a temperature sufficient to sinter the ceramic precursor to form the ceramic matrix composite, wherein at least 50 wt. % of the coating is dissolved from the surface of the coated tow into the slurry prior to step (d).

3. The method of claim 2, wherein the temperature is at least 1000° C.

4. The method of claim 2, wherein forming the ceramic prepreg into the green body comprises using filament winding to place the ceramic prepreg to form the green body.

5. The method of claim 2, wherein forming the ceramic prepreg into the green body comprises using advanced fiber placement to place the ceramic prepreg to form the green body.

6. The method of claim 5, wherein the tow is a spread tow.

7. The method of claim 6, wherein the ceramic fibers comprise oxide ceramic fibers.

8. The method of claim 7, wherein the solvent comprises water.

9. The method of claim 2, wherein the tow is a spread tow.

10. The method of claim 1, wherein the tow is a spread tow.

11. The method of claim 1, wherein the ceramic fibers comprise oxide ceramic fibers.

12. The method of claim 1, wherein the solvent comprises water.

13. The method of claim 1, wherein the coated tow comprises no greater than 3 weight percent of the coating based on the total weight of the coated tow.

14. The method of claim 1, wherein at least 95 percent by weight of the coating is soluble in the solvent at 25° C.

15. The method of claim 1, wherein during or subsequent to step (b), at least 80 wt. % of the coating is dissolved from the surface of the coated tow into the slurry.

16. The method of claim 1, wherein step (a) comprises exposing a plurality of coated tows to the ceramic matrix slurry.

17. The method of claim 16, wherein the coated tows are braided.

18. The method of claim 16, wherein the coated tows are woven to form a fabric.

19. The method of claim 16, wherein at least a portion of the plurality of the coated tows are spread tows.

* * * * *